C. B. HEPLER.
MOTOR VEHICLE STEERING MECHANISM.
APPLICATION FILED JUNE 2, 1915.
1,163,406.
Patented Dec. 7, 1915.
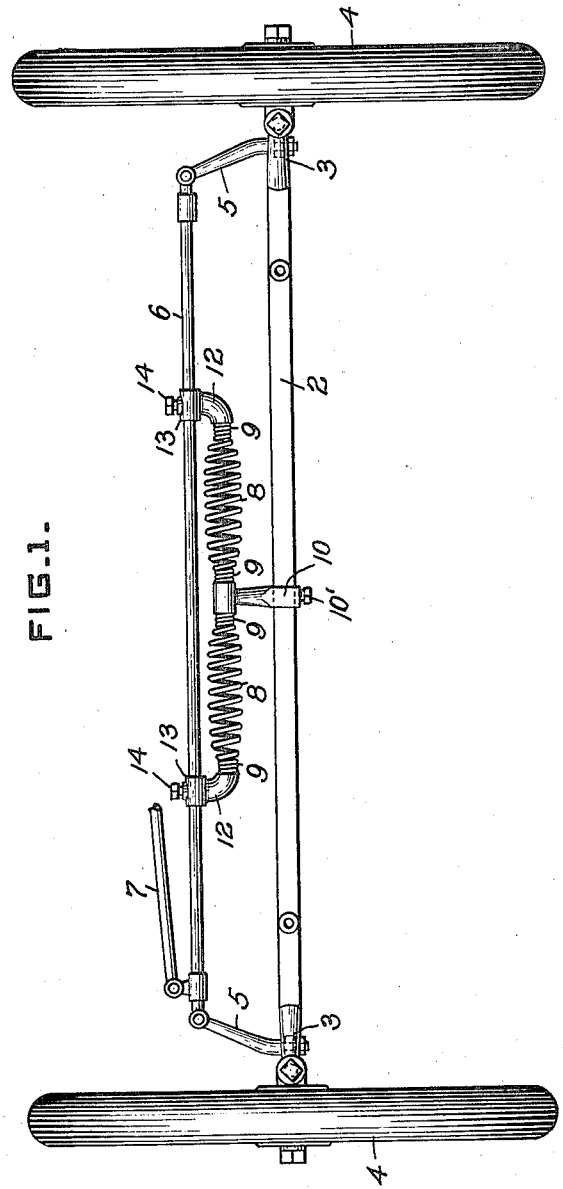
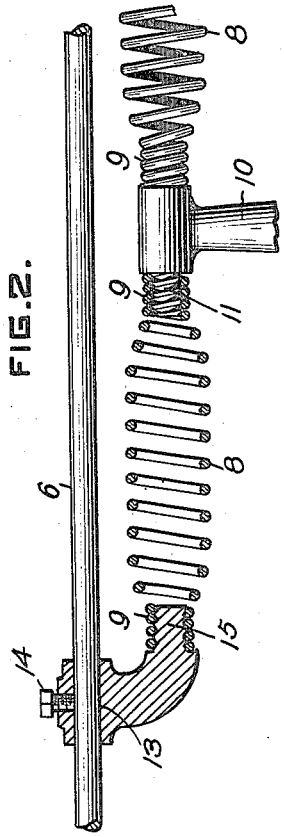
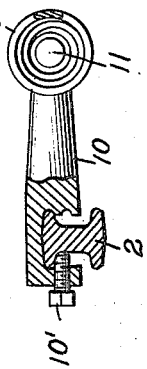
WITNESS:
J. Herbert Bradley.
INVENTOR.
Chas. B. Hepler
ATTORNEY

UNITED STATES PATENT OFFICE.

CHARLES B. HEPLER, OF TARENTUM, PENNSYLVANIA.

MOTOR-VEHICLE STEERING MECHANISM.

1,163,406.         Specification of Letters Patent.         Patented Dec. 7, 1915.

Application filed June 2, 1915. Serial No. 31,693.

*To all whom it may concern:*

Be it known that I, CHARLES B. HEPLER, a citizen of the United States, and resident of Tarentum, in the county of Allegheny and State of Pennsylvania, have invented certain new and useful Improvements in Motor-Vehicle Steering Mechanism, of which the following is a specification.

The object of this invention is to provide efficient means for maintaining the steering wheels of a motor vehicle normally in centered or straight-ahead position, the springs opposing movement in either direction from such position and operating to return the wheels to normal position when released by the operator.

The invention herein distinguishes from mechanisms heretofore proposed for this purpose by so arranging the springs that whenever the steering wheel mountings are deflected such deflection is opposed by one spring action in tension and the other spring in compression, thereby insuring such a double action as provides for effectively restoring the parts to normal position whenever the springs are free to act. The arrangement is such that either spring will operate to restore the steering wheels to normal position even though the other spring may be broken or through any cause may become inactive, and in this regard the invention differs essentially from those arrangements heretofore proposed wherein two springs act in opposition to each other rather than coöperate, so that if one is broken or becomes detached the remaining spring will immediately tend to so turn the wheels as to steer the vehicle to one side or the other of the road with grave danger of accident to the car and its occupants. With the invention herein, the springs coöperate in opposing movement of the steering wheel out of normal position, instead of being in opposition to each other, and hence if either spring is rendered inactive the device is still effective under the action of the remaining spring.

In the accompanying drawings, Figure 1 is a view in top plan of a steering mechanism embodying the invention, parts thereof being shown in section. Fig. 2 is a sectional plan of a portion of the mechanism drawn to a larger scale. Fig. 3 is a cross-section of the axle showing the spring holder secured thereto.

Referring to the drawings, 2 designates the front axle of a motor vehicle, and 3 are the knuckles of usual form pivotally mounted at the opposite ends thereof and carrying the stub axles on which the steering ground-wheels 4 are mounted. Projecting rearwardly from each knuckle is an arm 5, and these arms are connected by the equalizing rod 6 which parallels the axle, all as is usual and well known in motor vehicle construction. The steering mechanism in the car body may be connected to the wheel mountings, *i. e.*, knuckles 3, or to rod 6, in any suitable manner as by rod or link 7.

The centering mechanism consists of two coiled springs 8 which are preferably arranged with their longitudinal axes in line with each other and parallel with equalizing rod 6. The springs are of largest diameter at the center and taper toward their ends, and have their extremity portions curled or coiled in close formation to form sockets 9.

Various means may be provided for securing the springs to the axle and to the equalizing rod. As here illustrated, a bracket 10 is clamped to the axle in central position by set screw 10' and extends backwardly toward rod 6 and at opposite sides is provided with pin-like projections 11 which are preferably formed with thread-like grooves complementary with the closely coiled extremities 9 of the springs whereby the latter are secured thereon, as will be understood. The distant ends of the springs are secured to rod 6 by brackets 12, each of the latter being formed with an eye 13 through which rod 6 extends and to which it is secured by the set screw or bolt 14. Each of the bracket eyes is provided with a pin-like threaded projection 15 which is in line with and extends toward the similarly formed projections 11. By this means the springs are securely fastened at their opposite ends to the axle and equalizing rod and with their longitudinal axes parallel thereto.

In operation, one spring is adapted to be placed in tension and the other in compression whenever the steering mechanism is moved toward one side or the other. With the longitudinal axes of the springs parallel with rod 6 and hence parallel with the plane in which they are placed in compression, there is no buckling tendency, and this tendency is further forestalled by the fact that the springs are of relatively large diameter at their central portions so that the plane of compression is maintained within the lines of the spring.

With the springs in normal position, neither one is under tension or compression, but as soon as the steering mechanism is moved the action above described takes place. Thus it will be seen that the springs coöperate in the sense that both of them oppose movement of the steering mechanism in either direction. This results in the provision of a durable and positive equalizing action. And furthermore, as the springs do not act in opposition to each other, in the event that either spring is broken or becomes disconnected, the equalizing action will be maintained by the remaining spring and there will be no tendency to throw the steering wheels into a dangerous position such as is incident to those constructions wherein the centering action is the result of springs acting in opposition to each other.

I claim:

1. In vehicle steering mechanism, the combination of movable mountings for the steering wheels, a device connecting the mountings for causing them to move in unison, a coiled spring having its axis paralleling the direction of movement of said device and with one end connected thereto, and a fixed device to which the opposite end of the spring is connected, the spring held at its ends against deflection and operating in tension to oppose movement of said connecting device in one direction and operating in compression to oppose movement of said device in an opposite direction.

2. In vehicle steering mechanism, the combination of pivoted mountings for the steering wheels, a rod connecting the mountings for causing them to move in unison, two coiled springs paralleling the rod and with one spring adapted to be placed in tension and the other spring in compression when the rod is moved from central position, and means for securing the opposite ends of the springs.

3. In vehicle steering mechanism, the combination of an axle, mountings for steering wheels pivoted to the axle, a rod connecting the mountings for causing them to move in unison, a holding device projecting from the axle midway the mountings, two coiled springs paralleling said rod and arranged at opposite sides of the holding device and with the adjacent ends of the springs secured to said device, and means for securing the opposite ends of the springs to said rod.

4. In vehicle steering mechanism, the combination of an axle, mountings for steering wheels pivoted thereto, a rod connecting the mountings, a bracket secured to the axle and having pin-like projections at opposite sides, holding devices secured to the rod and having pin-like projections extending toward said bracket, and two coiled springs each being of largest diameter intermediate its ends and with the diameter tapering toward either end and with the end portions of each spring closely coiled and adapted to embrace the pin-like projections of said bracket and holding devices.

5. In vehicle steering mechanism, the combination of an axle, mountings for steering wheels pivoted thereto and a rod connecting the mountings, a bracket secured to and projecting from the axle, and a coiled spring having its axis paralleling the direction of movement of said connecting rod and with one end of the spring secured to the rod and with its opposite end secured to said bracket, the spring having convolutions of sufficient diameter to maintain the plane of compression within the lines of the spring when the latter is under compression, whereby buckling of the spring is forestalled.

6. In vehicle steering mechanism, the combination of an axle, mountings for steering wheels pivoted thereto and a rod connecting the mountings, a bracket secured to and projecting from the axle, coiled springs having their axes paralleling said rod and arranged at opposite sides of the bracket and with the adjacent ends of the spring secured thereto, and means for securing the distant ends of the springs to said rod, the springs being maintained in line with each other and each spring having convolutions of sufficient diameter to maintain the plane of compression within the lines of each spring when such spring is under compression, whereby movement of the connecting rod places one spring in tension and simultaneously places the other spring in compression and whereby buckling of the springs when under compression is forestalled.

In testimony whereof I affix my signature in presence of two witnesses.

CHARLES B. HEPLER.

Witnesses:
T. B. HEPLER,
I. MASON.